United States Patent [19]

Jewison

[11] Patent Number: 4,969,733
[45] Date of Patent: Nov. 13, 1990

[54] FOLDABLE PORTABLE OVERHEAD PROJECTOR

[75] Inventor: Charles B. Jewison, Batavia, Ill.

[73] Assignee: Dukane Corporation, St. Charles, Ill.

[21] Appl. No.: 415,617

[22] Filed: Oct. 2, 1989

[51] Int. Cl.$^5$ .................. G03C 21/14; G03C 21/20
[52] U.S. Cl. ........................................ 353/119; 353/66
[58] Field of Search .......... 353/119, DIG. 3, DIG. 4, 353/63, 64, 65–67

[56] References Cited

U.S. PATENT DOCUMENTS

| | | | |
|---|---|---|---|
| 2,273,936 | 2/1942 | Ceroni | 353/63 |
| 2,718,171 | 9/1955 | Fitz Gerald | 353/57 |
| 3,124,035 | 3/1964 | Lucas | 353/82 |
| 3,167,998 | 2/1965 | Appeldorn et al. | 353/99 |
| 3,285,126 | 11/1966 | Lucas | 353/37 |
| 3,366,005 | 1/1968 | Benedict | 353/98 |
| 3,653,754 | 4/1972 | Yamanaka | 353/61 |
| 3,979,160 | 9/1976 | Anderson et al. | 353/63 |
| 4,449,800 | 5/1984 | De Longis et al. | 353/119 |
| 4,588,271 | 5/1986 | Emura | 353/66 |
| 4,696,557 | 9/1987 | Tomizuka | 353/66 |
| 4,728,184 | 3/1988 | Kyhl | 353/122 |
| 4,735,500 | 4/1988 | Grunwald | 353/61 |
| 4,776,688 | 10/1988 | Ushiro et al. | 353/66 |
| 4,795,252 | 1/1989 | Kyhl | 353/122 |
| 4,811,110 | 3/1989 | Ohmura et al. | 353/256 |

FOREIGN PATENT DOCUMENTS 3216224 11/1983 Fed. Rep. of Germany ........ 353/63

Primary Examiner—William A. Cuchlinski, Jr.
Assistant Examiner—D. Price
Attorney, Agent, or Firm—Emrich & Dithmar

[57] ABSTRACT

A portable foldable overhead projector includes a housing having a front opening communicating with an interior cavity, and a bottom aperture communicating with the cavity and closable by a pair of pivoting doors which, when open, support the housing on support legs and accommodate movement of a mirror inside the housing between stowed and use positions. In the use position the mirror reflects light from a source through a transmitting stage in the top wall of the housing which forms a pivoting door to provide further access to the cavity. A mast pivots along the outside of the housing and carries a foldable projection head assembly on a rack and pinion mechanism. When the mast is lowered the rack and pinion can be operated to move the folded projection head assembly through the front opening into the cavity for storage.

20 Claims, 4 Drawing Sheets

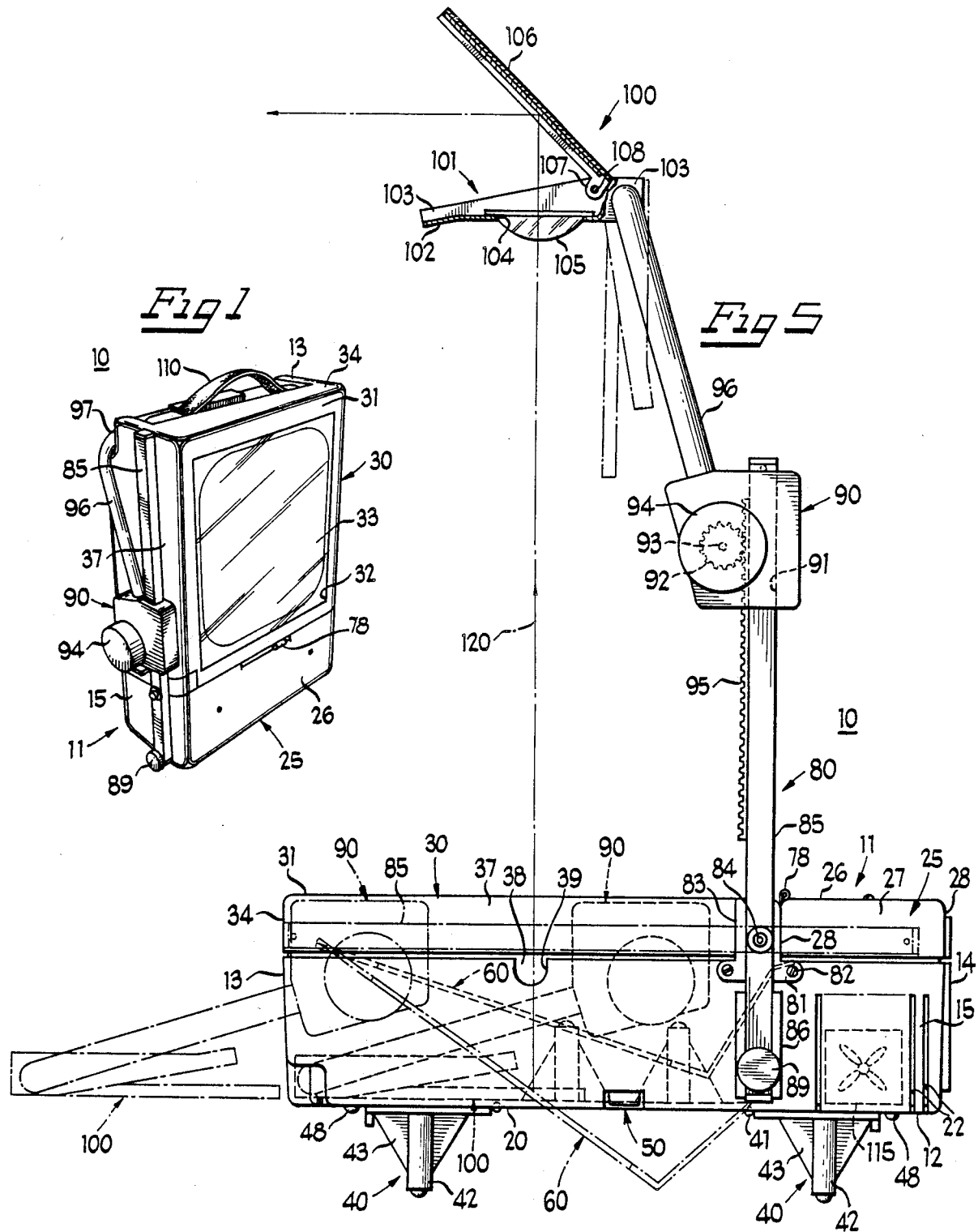

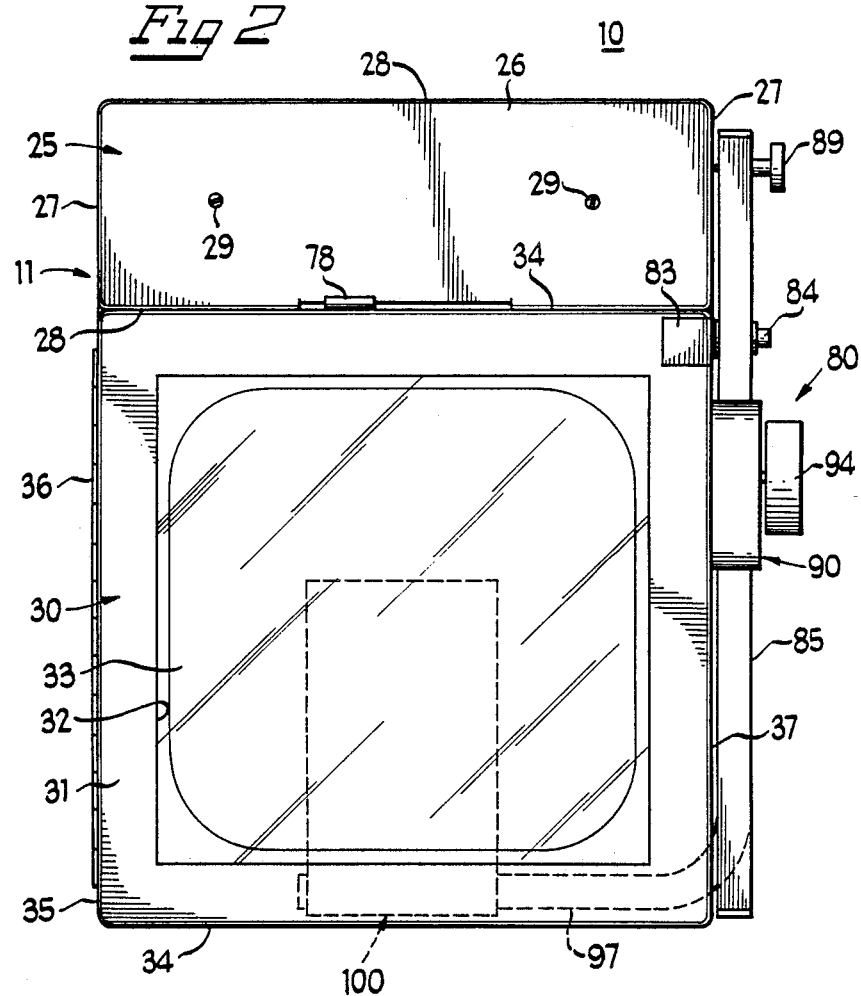
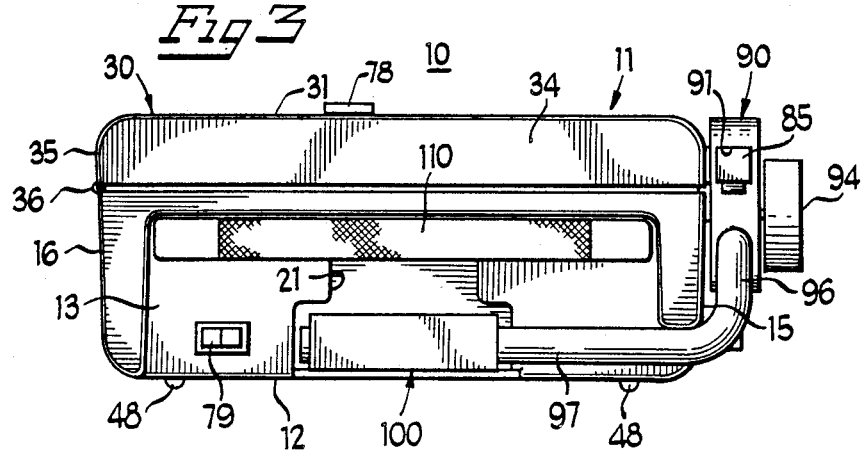

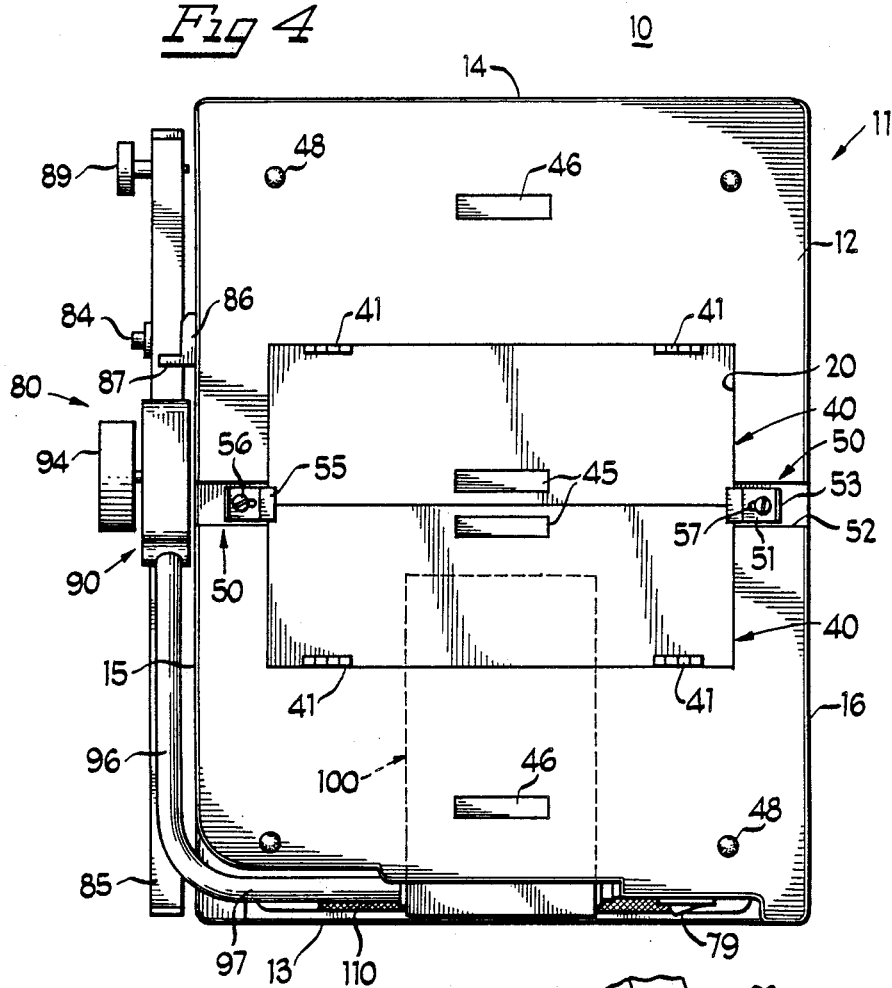
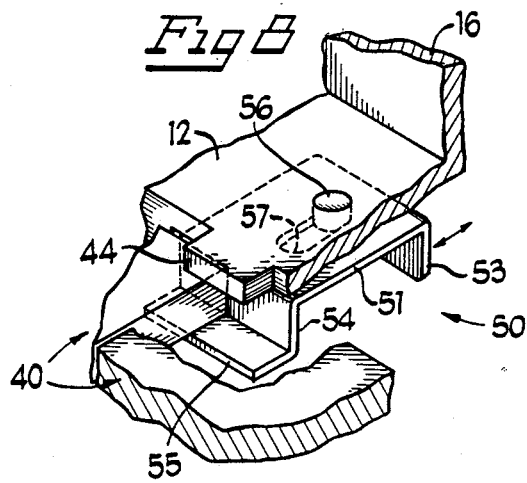
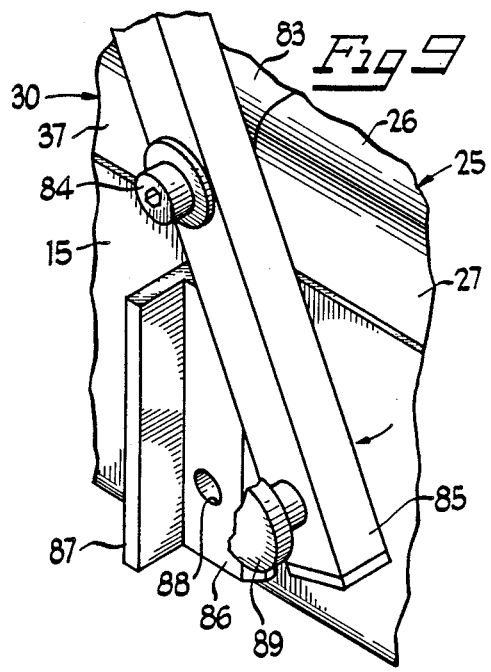

FOLDABLE PORTABLE OVERHEAD PROJECTOR

BACKGROUND OF THE INVENTION

1. Field of the Invention

The present invention relates to overhead projectors, and particularly to portable overhead projectors of the transmissive type.

2. Description of the Prior Art

In general, an overhead projector comprises a housing containing a light source and a stage means for supporting a Fresnel lens and on which may be disposed a transparency bearing an image to be projected. Light from the source is directed through the stage and the transparency to a projection head which is supported on a mast above the housing, the projection head including a reflecting mirror and a projection lens for directing and focusing an image from the transparency to a remote viewing surface.

The projection head and mast may be foldable to a stowage configuration when not in use. Furthermore, it is known to provide overhead projectors of this type in a portable form, so that all the parts may be disposed in the housing for transportation and storage.

However, in most prior art portable overhead projectors, it is necessary to remove and/or disassemble parts of the device in order to move it to its storage or transportation configuration. It is known to provide a portable overhead projector which does not require disassembly, such a projector being disclosed in U.S. Pat. No. 3,653,754. However, that projector has a large and bulky housing and requires a rather complex series of folding steps in order to move the parts between their use and storage configurations.

SUMMARY OF THE INVENTION

It is a general object of the present invention to provide an improved overhead projector which avoids the disadvantages of prior devices while affording additional structural and operating advantages.

An important feature of the present invention is the provision of a portable overhead projector which is relatively compact and lightweight, and yet does not require removal or disassembly of any parts in shifting between the storage and use configurations.

In connection with the foregoing feature, it is another feature of the invention to provide an overhead projector of the type set forth, which is of relatively simple and economical construction.

In connection with the foregoing features, it is still another feature of the invention to provide an overhead projector of the type set forth, which affords a housing of minimal size by permanently disposing portions of the structure outside the housing.

In connection with the foregoing feature, it is another feature of the invention to provide an overhead projector of the type set forth in which portions of the housing are convertible between different functions in storage and use configurations.

These and other features of the invention are attained by providing a portable foldable overhead projector comprising a housing containing a light source, the housing having an opening communicating with a cavity therein, transparency stage means on the housing for transmitting light from the source along a light path, mast means mounted on the housing externally thereof for movement between raised and lowered positions, projection means carried by the mast means and disposable in the light path when the mast means is in its raised position for directing and focusing an image onto a remote viewing surface, and drive means for moving the projection means through the opening between an unstowed position disposed outside the housing and a stowed position disposed in the cavity within the housing when the mast means is in its lowered position.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a perspective view of a portable overhead projector constructed in accordance with and embodying the features of the present invention, and disposed on end in it transportation or storage configuration;

FIG. 2 is an enlarged, top plan view of the overhead projector of FIG. 1;

FIG. 3 is a front elevational view of the overhead projector of FIG. 2;

FIG. 4 is a bottom plan view of the overhead projector of FIG. 3; , FIG. 5 is a side elevational view of the overhead projector of FIGS. 2-4, with the parts disposed in their use configuration, and illustrating movement of the parts between the use and storage configurations;

FIG. 8 is a further enlarged, fragmentary, perspective view of the latching mechanism of the bottom doors of the overhead projector; and FIG. 9 is a further enlarged, fragmentary, perspective view of the mast latch mechanism.

DESCRIPTION OF THE PREFERRED EMBODIMENT

Figure 6:
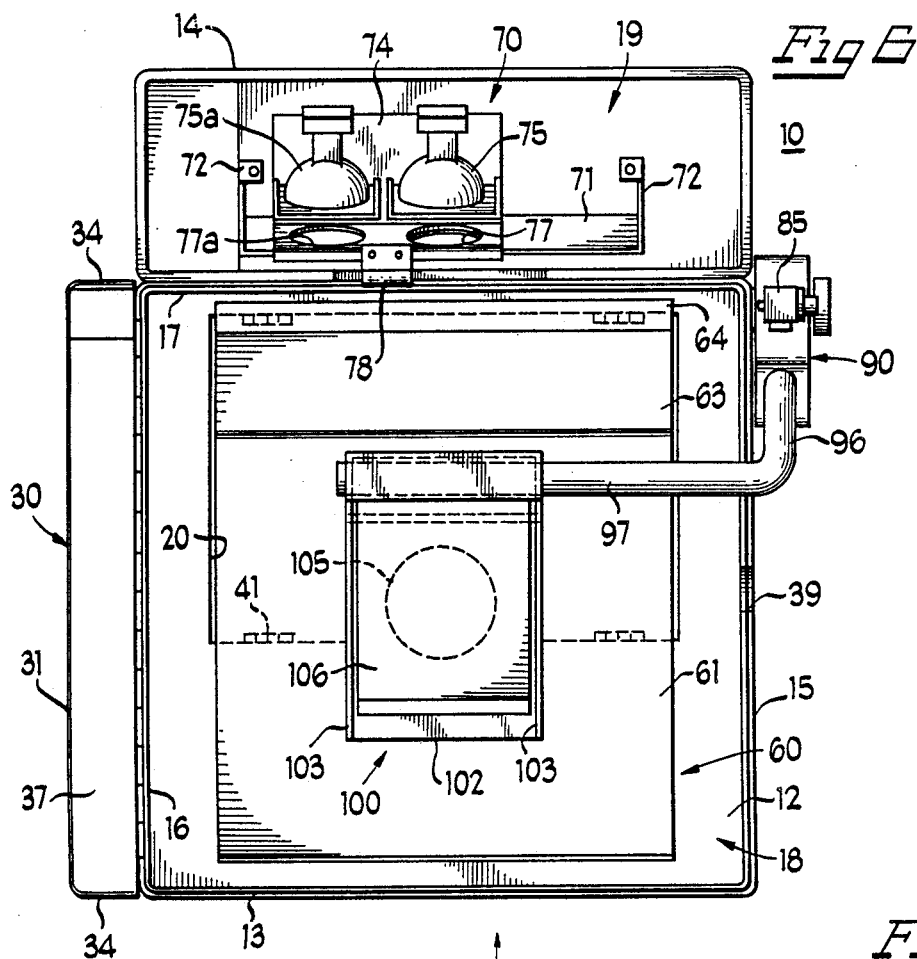
FIG. 6 is a top plan view of the overhead projector of FIG. 5 in its use configuration, with the transparency stage open and with the cover of the lamp compartment removed.
Figure 7:
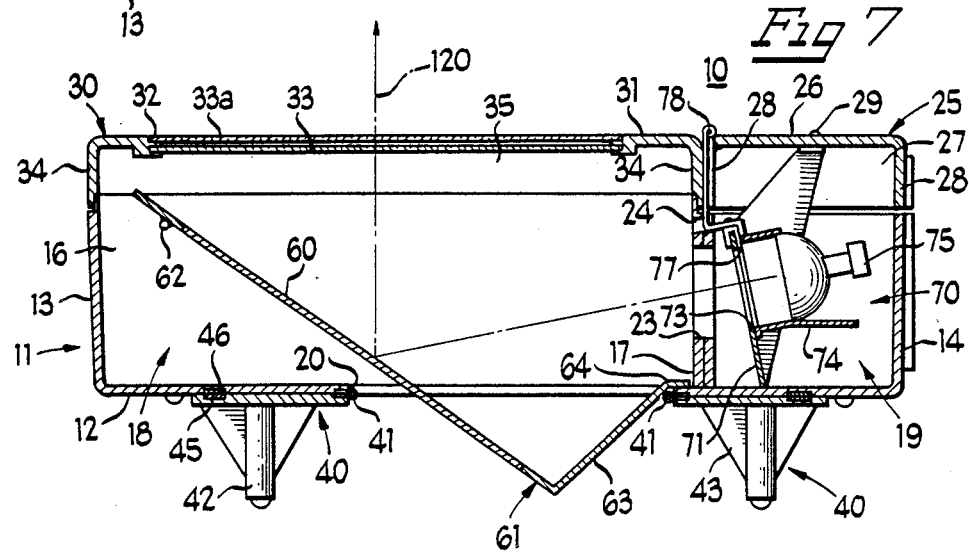
FIG. 7 is a view in vertical section through the housing of the overhead projector in its use configuration of FIG. 5.

Referring to FIGS. 1-4, there is illustrated an overhead projector, generally designated by the numeral 10, constructed in accordance with and embodying the features of the present invention. The overhead projector 10 includes a generally box-like housing or case 11 having a bottom wall 12, upstanding end walls 13 and 14 and upstanding side walls 15 and 16. Referring also to FIGS. 6 and 7, the side walls 15 and 16 are interconnected by an upstanding partition wall 17 which is substantially perpendicular to the bottom wall 12 and is disposed approximately one-fourth of the distance from the end wall 14 to the end wall 13. The partition wall 17 serves to divide the interior of the housing 11 into a relatively large front compartment or cavity 18 and a smaller rear compartment or cavity 19.

Formed in the bottom wall 12 is a large rectangular aperture 20, and formed in the end wall 13, centrally thereof is an irregular opening 21 which is generally in the shape of an inverted T (FIG. 3). The rear compartment 19 is vented by louvers 22 formed in the side wall 15 (see FIG. 5). Formed in the partition wall 17, substantially centrally thereof, is an opening 23. Also formed in the partition wall 17 adjacent to the upper edge thereof and extending longitudinally substantially the entire length thereof is an elongated slot 24. The rear compartment 19 is closed by a rear cover 25 which includes a flat, rectangular top wall 26, integral along the side edges thereof with depending side walls 27 and integral along the front and rear edges thereof with depending end walls 28. The side walls 27 respectively mate with the rear ends of the side walls 15 and 16, while the end walls 28 respectively mate with the end wall 14 and the partition wall 17 for closing the rear compartment 19, being held in place by suitable fasteners 29 (FIG. 2).

The front compartment 18 is closed by a main cover 30, having a flat, rectangular, top wall 31 which defines a stage, and is provided with a large rectangular opening 32 therein centrally thereof, closed by a Fresnel lens 33 disposed beneath a plain glass plate 33a which is substantially flush with the top wall 31 (FIG. 7). Integral with the top wall 31 at the front and rear edges thereof are depending end walls 34. Integral with the top wall 31 along one side edge thereof is a depending side wall 35, the lower edge of which is hingedly coupled to the upper edge of the side wall 16 by a piano-type hinge 36. Integral with the top wall 31 along the other side edge thereof is a depending side wall 37 adapted for mating engagement with the upper edge of the side wall 15, while the end walls 34 respectively mate with the end wall 13 and the partition wall 17 for closing the front compartment 18. The main cover 30 may be latched in place by a suitable latch member 38 carried by the side wall 37, and being manually releasable by insertion of a user's finger or thumb in a notch 39 in the upper edge of the side wall 15 (FIG. 5). It will be appreciated that the main cover 30 is movable between a closed condition, illustrated in FIGS. 2, 3, 5 and 7, and an open condition, illustrated in FIG. 6, for providing access to the interior of the front compartment 18.

The aperture 20 in the bottom wall 12 is closed by a pair of bottom doors 40, each pivotally mounted on hinges 41 for movement between an open condition illustrated in FIGS. 5 and 7 and a closed condition illustrated in FIG. 4. Each of the doors 40 is provided along its inner surface with a pair of support legs 42 stabilized by gussets 43, the support legs 42 being disposed for engagement with an associated underlying support surface for supporting the housing 11 when the doors 40 are open to provide clearance between the underlying support surface and the bottom wall 12 for a purpose to be explained more fully below. The bottom wall 12 is provided with stop tabs 44 on opposite sides of the aperture 20, centrally thereof (see FIG. 8) for engagement with the distal edge corners of the doors 40 to provide stops therefor in the closed condition thereof. Each of the doors 40 carries on its outer surface a magnet 45 adapted for magnetic engagement with corresponding strike plates 46 on the outer surface of the bottom wall 12 for holding the doors 40 in their open condition. Also carried by the bottom wall 12, respectively adjacent to the four corners thereof, are four depending lugs or feet 48 to support the housing 11 when the doors 40 are closed.

The doors 40 are latched in their closed conditions by a pair of latch assemblies 50, respectively disposed along opposite sides of the aperture 20 centrally thereof. Referring to FIGS. 4 and 8, each of the latch assemblies 50 includes a latch member 51 comprising a rectangular plate which is adapted for sliding movement in a corresponding groove 52 in the bottom wall 12. Each latch member 51 is provided at its outer end with a depending actuator tab 53 adapted to be manually gripped by a user for operating the latch assembly 50. Integral with the opposite end of the latch member 51 is a depending front wall 54, is integral at its distal edge with a retaining flange 55 which projects laterally inwardly of the aperture 20. Fixedly secured to the bottom wall 12, respectively in the grooves 52, are two guide pins 56 which are respectively received through complementary slots 57 in the latch members 51 for guiding sliding horizontal movement of the latch members 51 in the direction of the arrows in FIG. 8 between latching and unlatching conditions.

In operation, when the doors 40 are closed, the latch members 51 are slid inwardly along the grooves 52 to their latching conditions illustrated in FIGS. 4 and 8, wherein the retaining flanges 55 underlie the mating edges of the doors 40 for holding them closed. When it is desired to open the doors 40, the latch members 51 are slid laterally outwardly in the grooves 52 until the retaining flanges 55 clear the side edges of the doors 40, to permit movement thereof to their open conditions.

Referring to FIGS. 5 and 7, there is disposed in the front compartment 18 of the housing 11 a mirror 60 which is carried by a large, flat, rectangular, main plate 61. The plate 61 is coupled by pivots 62, respectively to the side walls 15 and 16, to accommodate pivotal movement of the mirror 60 between a stowed position, illustrated in dashed line in FIG. 5, and a use position illustrated, in dot-dashed line in FIG. 5. Integral with the main plate 61 at its distal edge and projecting therefrom at an angle of slightly greater than 90, is a rectangular end plate 63, provided at its distal edge with a forwardly projecting stop lip 64 adapted to rest upon the inner surface of the bottom wall 12 at one end edge of the aperture 20 when the mirror 60 is disposed in its use position, to limit the movement of the mirror 60, as can best be seen in FIG. 7. It will be appreciated that, when the doors 40 are closed, the mirror 60 is confined to its stowed position and is prevented from movement to its use position. When the doors 40 are open, this permits the mirror 60 to drop to its use position, the length of the support legs 42 being sufficient to provide adequate clearance between the bottom wall 12 and the underlying support surface to accommodate the mirror 60 in its use position.

Mounted in the rear compartment 19 is a lamp assembly 70 which includes a rectangular frame 71 provided with attachment legs 72 at the opposite ends thereof for attachment to the cover 25. The frame 71 has a hole 73 formed therein centrally thereof (FIG. 7). Mounted immediately behind the frame 71 for sliding reciprocating movement therealong is a carriage 74, which supports a primary lamp 75 and an auxiliary lamp 75a. The carriage 74 has holes 77 and 77a formed therethrough respectively in front of the lamps 75 and 75a. The carriage 74 is provided with a forwardly and upwardly extending handle tab 78 which extends through the slot 24 in the partition wall 17 and upwardly through a notch in the rear cover 25 for access by a user.

More specifically, by manipulation of the handle tab 78, the carriage 74 may be slid between first and second positions, respectively aligning the holes 77 and 77a with the hole 73 in the frame 71, which is, in turn, aligned with the opening 23 in the partition wall 17. An ON-OFF switch 79 is provided on the end wall 13 for energization of whichever one of the lamps 75 and 75a is aligned with the opening 23. Thus, it will be appreciated that the aligned one of the lamps 75 and 75a will direct a beam of light through its corresponding hole 77 or 77a, through the hole 73 in the frame 71 and the opening 23 in the partition wall 17, into the front compartment 18, and onto the main plate 61 of the mirror 60, when the mirror 60 is disposed in its use position, as illustrated in FIG. 7. When the lamp 75 burns out, the user simply slides the carriage 74 over to bring the other lamp 75a into position for use.

A mast assembly 80 is mounted on the outside of the housing 11. More specifically, a pivot bracket 81 is fixedly secured by suitable fasteners 82 to the upper edge of the side wall 15 adjacent to the rear end of the main cover 30, the bracket 81 having an upwardly extending arm 83 which may be disposed in a corresponding groove or recess in the main cover 30. Projecting laterally outwardly from the pivot bracket 81 is a pivot pin 84, which extends through a complementary opening in an elongated mast 85 for pivotal mounting thereof. Preferably, the mast 85 is generally square in transverse cross section and is pivoted at a point approximately one-quarter of the distance from one end thereof. A generally L-shaped lock bracket 86 is fixedly secured to the outer surface of the side wall 15 immediately beneath the pivot bracket 81, the lock bracket 86 having a laterally outwardly extending stop flange 87 (FIG. 9). The other flange of the lock bracket 86, which is secured to the side wall 15, has a hole 88 therethrough adapted for receiving a latch pin 89 which is resiliently carried by the mast 85.

In use, the mast 85 is pivotally movable between a storage position, illustrated in FIGS. 1-4, extending substantially parallel to the bottom wall 12 along the adjacent edge of the side wall 15, and a use position substantially perpendicular to the bottom wall 12, as illustrated in FIGS. 5 and 6. In this use position, the lower end of the mast 85 engages the stop flange 87 to limit pivotal movement of the mast 85. When the mast 85 is in its use position, the latch pin 89 is engageable in the hole 88 for locking the mast in position. Preferably, the latch pin 89 is adapted to be pulled laterally outwardly against a bias spring (not shown) to disengage it from the hole 88.

An adjustment carriage 90 is mounted on the mast 85, being provided with a rectangular bore 91 therethrough (FIG. 3) for receiving the distal end of the mast 85. A pinion gear 92 is carried by the adjustment carriage 90 for rotation about a shaft 93 by manual operation of a knob 94 (FIG. 5). The pinion gear 92 is disposed for meshing engagement with an elongated rack 95 formed along the adjacent side edge of the mast 85. Thus, it will be appreciated that as the pinion gear 92 is rotated, the adjustment carriage 90 is moved longitudinally of the mast 85. Fixedly secured to the adjustment carriage 90 and projecting upwardly therefrom at an angle to the longitudinal axis of the mast 85 is an elongated projection arm 96, provided at its distal end with a laterally extending end bar 97.

A projection head assembly 100 is carried by the end bar 97 of the projection arm 96. More specifically, the projection head assembly 100 includes a lens assembly 101 having a support plate 102 provided with upstanding side walls 103, having aligned openings at one end thereof for receiving the end bar 97. Formed in the support plate 102 is an opening 104 in which is mounted a focusing lens 105. The lens assembly 101 is pivotally movable about the axis of the end bar 97 between a use position, illustrated in solid line in FIG. 5, and a storage position, illustrated in dot-dashed line in FIG. 5.

The projection head assembly also includes a rectangular mirror 106 provided with mounting ears 107 at the rear end thereof which are, respectively, pivoted on pivot pins 108 carried by the side walls !03 of the lens assembly 101. The mirror 106 is pivotally movable between a use position, illustrated in solid line in FIG. 5, and a storage position, illustrated in dot-dashed line in FIG. 5.

A handle 110 may be provided on the end wall 113 to facilitate carrying of the overhead projector 10. A blower 115 may be disposed in the rear compartment 19 to ventilate and cool the lamp assembly 70 through the louvers 22. The blower 115 may be energized by the ON-OFF switch 79 simultaneously with the lamp assembly 70.

The overhead projector 10 is normally transported in its folded storage configuration, illustrated in FIG. 1. In this configuration, the mast assembly 80 is disposed in its storage position, with the mast 85 disposed substantially parallel to the bottom wall 12, and with the lens assembly 101 and the mirror 106 of the projection head assembly 100 disposed in their storage positions, and with the entire projection head assembly 100 being stowed in the front compartment 18 of the housing of the housing 11. The bottom doors 40 are latched in their closed conditions, and the main cover 30 is latched closed. For transportation, the projector 10 may be carried by the handle 110 and may be rested on either the end wall 14 or on the bottom wall 12. It will be noted that in this configuration, the mast assembly 80 is disposed closely adjacent to the side wall 15, while the end bar 97 of the projection arm 96 is disposed in a recessed portion of the end wall 13. Thus, the overall projector 10 presents a very compact profile.

When it is desired to use the overhead projector 10, the bottom doors 40 are unlatched and opened, and the housing 11 is supported on the legs 42, allowing the mirror 60 to drop to its use position. If desired, an electric power cord (not shown) may be stowed in the front compartment 18 beneath the mirror 60 for access when the doors 40 are open.

The projection head assembly 100 is then unstowed by rotating the knob 94, thereby moving the adjustment carriage 90 longitudinally of the mast 85 toward the distal end thereof. As the adjustment carriage 90 is so moved from the dashed line position to the dot-dash line position in FIG. 5, the projection head assembly 100 is unstowed, moving from the front compartment 18 to the exterior of the housing 11 through the opening 21 in the end wall 13. When the projection head assembly 100 has cleared the end wall 13, the mast 85 is pivoted to its upright use position, and locked in place by means of the latch pin 89. The lens assembly 101 is then pivoted in a counterclockwise direction, as viewed in FIG. 5, from its storage position to its use position, and the mirror 106 is then pivoted in a clockwise direction, as viewed in FIG. 5, from its storage position to its use position. As can be seen in FIG. 5, in this use configuration, the projection head assembly 100 is positioned directly above the Fresnel lens 33 of the stage formed by the top wall 31. The ON-OFF switch 79 is then actuated to turn on the lamp 75 and the blower 115.

When the lamp 75 is energized, it directs a beam of light along a light path 120, as illustrated in FIGS. 5 and 7, onto the mirror 60, which reflects the beam upwardly through the Fresnel lens 33 and thence upwardly through the lens 105 and onto the mirror 106, in a known manner. When a transparency (not shown) is disposed on the Fresnel lens 33 and the light beam is transmitted therethrough, an image of the information thereon is focused by the lens 105 onto the mirror 106, which projects the image horizontally onto a remote viewing surface (not shown), such as screen or the like. If the lamp 75 burns out, the user simply slides the carriage 74 to the right, as viewed in FIG. 6, by use of the handle tab 78 to bring the lamp 75a into the use position.

When it is desired to restow the overhead projector 10, the lens assembly 101 and the mirror 106 of the projection head assembly 100 are pivoted back to their storage positions and the mast 85 is unlatched and pivoted back down to its storage position. The knob 94 is then again rotated for driving the adjustment carriage 90 back along the mast 85 for withdrawing the projection head assembly 100 through the opening 21 in the end wall 13 and into front compartment 18 in the housing 11. The housing 11 may then be stood on end by use of the handle 110 and the mirror 60 is returned to its storage position and the power cord restowed. The doors 40 are then closed and latched in their closed conditions.

From the foregoing, it can be seen that there has been provided an improved portable foldable overhead projector which can be shifted between storage and use configurations without the removal or disassembly of any parts and which, in its storage configuration, presents a very compact profile.

I claim:

1. A portable foldable overhead projector comprising: a housing containing a light source, said housing having an opening communicating with a cavity therein, transparency stage means on said housing for transmitting light from said source along a light path, mast means mounted on said housing externally thereof for movement between raised and lowered positions, projection means carried by said mast means and disposable in said light path when said mast means is in its raised position for directing and focusing an image onto a remote viewing surface, and drive means for moving said projection means relative to said mast means through said opening between an unstowed position disposed outside said housing and a stowed position disposed in said cavity within said housing while said mast means is mounted in its lowered position externally of said housing.

2. The projector of claim 1, wherein said housing includes a top door carrying said transparency stage means and movable between open and closed conditions for providing access to the interior of said housing.

3. The projector of claim 1, wherein said mast means is pivotally movable between the raised and lowered positions thereof.

4. The projector of claim 3, and further comprising means for locking said mast means in its raised position.

5. The projector of claim 1, wherein said projection means includes reflector means and lens means mounted for movement between a folded configuration for stowage and an unfolded configuration for use.

6. The projector of claim 1, wherein said drive means includes means for moving said projection means longitudinally of said mast means.

7. The projector of claim 6, wherein said drive means includes rack and pinion means.

8. A portable foldable overhead projector comprising: a housing containing a light source, said housing having an aperture therein, transparency stage means on said housing for transmitting light, reflective means mounted in said housing for movement between a stowed position disposed entirely within said housing and a use position extending outwardly from said housing through said aperture, said reflective means in the use position thereof reflecting light from said source along a path through said transparency stage means, and projection means carried by said housing externally thereof in a use configuration along said path for directing and focusing an image onto a remote viewing surface.

9. The projector of claim 8, wherein said reflective means is pivotally movable between the stowed and use positions thereof.

10. The projector of claim 8, wherein said aperture is formed in the bottom of said housing, said reflective means dropping through said aperture to the use position thereof.

11. The projector of claim 10, wherein said housing includes support legs providing clearance between the bottom of said housing and an associated underlying support surface to accommodate movement of said reflective means to the use position thereof.

12. The projector of claim 10, wherein said reflective means includes stop means engageable with said housing when said reflective means is in its use position for limiting the movement thereof.

13. The projector of claim 8, and further comprising an auxiliary light source in said housing.

14. The projector of claim 13, and further comprising carriage means supporting said light sources and shiftable between first and second positions for moving said light sources respectively into position for directing light to said reflective means.

15. A portable foldable overhead projector comprising: a housing containing a light source, said housing having an aperture therein, transparency stage means on said housing for transmitting light, reflective means mounted in said housing for movement between a stowed position disposed entirely within said housing and a use position extending outwardly from said housing through said aperture, said reflective means in the use position thereof reflecting light from said source along a path through said transparency stage means, projection means carried by said housing externally thereof in a use configuration along said path for directing and focusing an image onto a remote viewing surface, and door means mounted on said housing for movement with respect thereto between open and closed conditions for respectively opening and closing said aperture when said reflective means is disposed in its stowed position, said door means in the open condition thereof accommodating movement of said reflective means between its stowed and use positions.

16. The projector of claim 15, wherein said aperture is formed in the bottom of said housing.

17. The projector of claim 15, wherein said door means includes a pair of doors pivotally movable between the open and closed conditions thereof and cooperating in their closed condition to close said aperture.

18. The projector of claim 17, wherein said aperture is formed in the bottom of said housing, each of said doors carries support legs engageable with an associated underlying support surface when said doors are disposed in their open condition for providing clearance between the bottom of said housing and the underlying support surface.

19. The projector of claim 15, and further comprising means for latching said door means in the closed condition thereof.

20. The projector of claim 15, and further comprising means for retaining said door means in the open condition thereof.

* * * * *